(12) United States Patent
Hershberger (10) Patent No.: US 12,128,487 B2
(45) Date of Patent: Oct. 29, 2024

(54) BIDIRECTIONAL SHEET METAL CUTTING TOOL

(71) Applicant: Nelson Hershberger, Mattoon, IL (US)

(72) Inventor: Nelson Hershberger, Mattoon, IL (US)

( * ) Notice: Subject to any disclaimer, the term of this patent is extended or adjusted under 35 U.S.C. 154(b) by 229 days.

(21) Appl. No.: 16/770,588

(22) PCT Filed: Dec. 22, 2017

(86) PCT No.: PCT/US2017/068214
§ 371 (c)(1),
(2) Date: Jun. 5, 2020

(87) PCT Pub. No.: WO2019/125487
PCT Pub. Date: Jun. 27, 2019

(65) Prior Publication Data
US 2021/0162521 A1    Jun. 3, 2021

(51) Int. Cl.
*B23D 19/04* (2006.01)
*B26D 1/24* (2006.01)

(52) U.S. Cl.
CPC ............ *B23D 19/04* (2013.01); *B26D 1/245* (2013.01)

(58) Field of Classification Search
CPC ...... B23D 19/04; B23D 19/06; B23D 19/065; B23D 19/00; B26D 1/12; B26D 1/24; B26D 1/245
USPC ......... 30/263–265, 287, 292, 299, 306, 307, 30/101, 102
See application file for complete search history.

(56) References Cited

U.S. PATENT DOCUMENTS 1,511,892 A * 10/1924 Lusby .................. B26B 25/005
30/292
1,720,305 A * 7/1929 Tjernlund .............. B23D 19/08
30/232

(Continued)

FOREIGN PATENT DOCUMENTS

| CN | 1045940 A | 10/1990 |
| DE | 20306757 U1 | 8/2003 |
| KR | 20150060160 A | 6/2015 |

OTHER PUBLICATIONS

"Mark II TrimMaster", Van Mark Products Corporation (2016), published at www.van-mark.com/brakes/mark-II-trimmaster-contractor-grade.shtml.

*Primary Examiner* — Adam J Eiseman
*Assistant Examiner* — Richard D Crosby, Jr.
(74) *Attorney, Agent, or Firm* — Nath, Goldberg & Meyer; Joshua B. Goldberg (57) ABSTRACT

The bidirectional sheet metal cutting tool (100) is a cutting tool that performs cuts on webbed material in which a length of cut exceeds a physical dimension of the cutting tool (100), while limiting flexing of the webbed material during a cutting operation. The cutter assembly (140) is configured to ride on a guide track (145), and has upper and lower sections. The upper and lower sections have an offset attachment to each other at an interface, so that the webbed material passes the offset after cutting in an extended bypass cutting operation. An interface between the upper and lower sections has a curved profile, allowing deflection of the webbed material on at least one side of a cutting direction. The cutting tool (100) can be mounted to a sheet metal forming tool as a slitter (500), permitting sequential operations of the metal forming tool.

10 Claims, 6 Drawing Sheets

(56) References Cited

U.S. PATENT DOCUMENTS

| | | | | |
|---|---|---|---|---|
| 1,745,476 | A * | 2/1930 | Cohn | D06H 7/04 83/451 |
| 2,698,661 | A * | 1/1955 | MacQuarrie | B23D 19/06 83/492 |
| 3,136,191 | A * | 6/1964 | Madge | C03B 33/10 83/578 |
| 3,137,192 | A * | 6/1964 | McNeill | B26D 1/105 83/614 |
| 3,277,760 | A * | 10/1966 | Keene | B26D 1/045 83/614 |
| 3,380,158 | A * | 4/1968 | Du Bois | B26D 1/245 30/233 |
| 3,399,586 | A * | 9/1968 | Insolio | C03B 33/10 83/881 |
| 3,742,793 | A * | 7/1973 | Gray | C03B 33/10 83/881 |
| 3,791,246 | A * | 2/1974 | Lazickas | B26F 1/3826 83/939 |
| 3,913,370 | A * | 10/1975 | Break | B21D 5/042 72/322 |
| 3,949,633 | A * | 4/1976 | Cauffiel | B23D 19/04 83/210 |
| 4,001,936 | A * | 1/1977 | Matsushita | B26B 5/005 30/287 |
| 4,245,534 | A * | 1/1981 | Van Cleave | B23D 19/04 83/859 |
| 4,282,735 | A * | 8/1981 | Break | B21D 5/042 72/466.8 |
| 4,283,853 | A * | 8/1981 | Fazzini | B23D 29/026 30/294 |
| 4,381,605 | A * | 5/1983 | Holm | B23D 19/04 30/240 |
| 4,506,577 | A * | 3/1985 | Shinomiya | B26D 5/04 83/564 |
| 4,510,785 | A * | 4/1985 | Triouleyre | B21D 5/042 72/320 |
| 4,589,315 | A * | 5/1986 | Clement | B26D 1/08 83/436.15 |
| 4,676,133 | A * | 6/1987 | Fujimura | B23D 19/08 83/497 |
| 4,738,018 | A | 4/1988 | Ebrahimian | |
| 4,934,234 | A * | 6/1990 | Cavagna | B26D 7/2635 83/504 |
| 5,007,318 | A * | 4/1991 | Cox | B23D 19/04 83/422 |
| 5,404,739 | A * | 4/1995 | George, II | B23D 31/00 83/485 |
| 5,503,053 | A * | 4/1996 | Onishi | B26D 1/245 83/578 |
| 5,582,053 | A * | 12/1996 | Chubb | B23D 31/00 83/485 |
| 5,802,906 | A * | 9/1998 | Lillbacka | B23D 31/00 72/306 |
| 5,860,312 | A | 1/1999 | Anderson | |
| 5,899,000 | A * | 5/1999 | Break | B26B 25/005 83/485 |
| 5,904,085 | A * | 5/1999 | Onishi | B26D 1/205 83/578 |
| 5,927,135 | A * | 7/1999 | Kutschker | B21D 5/042 72/319 |
| 5,937,723 | A * | 8/1999 | Kirikoshi | B26D 5/08 83/578 |
| 6,000,268 | A * | 12/1999 | Van Cleave | B23D 31/00 72/294 |
| 6,155,152 | A * | 12/2000 | Bilstein | B26D 1/245 83/478 |
| 6,408,527 | B1 * | 6/2002 | Chubb | B21D 17/04 83/885 |
| 6,427,511 | B1 * | 8/2002 | Kutschker | B21D 5/04 72/319 |
| 6,516,648 | B1 * | 2/2003 | Kutschker | B21D 5/042 72/319 |
| 6,721,060 | B1 * | 4/2004 | Kawamura | B26D 1/245 358/1.3 |
| 6,748,783 | B1 * | 6/2004 | Chubb | B21D 5/04 72/461 |
| 6,763,695 | B1 * | 7/2004 | Chubb | B23D 19/04 83/455 |
| 7,021,096 | B2 * | 4/2006 | Barnett | B21D 5/042 72/31.1 |
| 7,028,596 | B1 * | 4/2006 | Langhans | B23D 35/007 83/507 |
| 7,089,669 | B2 * | 8/2006 | Fritz | B23D 29/026 30/292 |
| 7,117,705 | B2 * | 10/2006 | Clark | B21D 5/00 83/502 |
| 7,134,372 | B2 * | 11/2006 | Flaherty | B23D 35/007 83/508.3 |
| 7,975,582 | B1 * | 7/2011 | Coon | B23D 19/04 83/436.45 |
| 8,079,244 | B2 * | 12/2011 | Spairani | B21D 53/64 72/307 |
| 8,500,350 | B2 * | 8/2013 | Kumai | B41J 11/706 400/621 |
| 10,272,583 | B2 * | 4/2019 | Oiwa | B26D 7/2635 |
| 2002/0022562 | A1 * | 2/2002 | Waldeck | B26D 7/2635 493/463 |
| 2002/0152866 | A1 * | 10/2002 | Bilstein | B26D 5/04 83/698.51 |
| 2003/0150305 | A1 * | 8/2003 | Fisher | B23D 19/04 83/13 |
| 2003/0233756 | A1 * | 12/2003 | Muhlebach | A47G 27/0487 30/279.2 |
| 2004/0103706 | A1 * | 6/2004 | Codatto | B21D 5/045 72/31.11 |
| 2005/0061121 | A1 * | 3/2005 | Lauderbaugh | B26D 7/2635 83/13 |
| 2005/0086991 | A1 * | 4/2005 | Barnett | B21D 11/22 72/319 |
| 2006/0185487 | A1 * | 8/2006 | Li | B26D 1/245 83/498 |
| 2007/0056419 | A1 * | 3/2007 | Tippmann, Sr. | B26D 7/2635 83/531 |
| 2007/0062355 | A1 * | 3/2007 | Supe-Dienes | B26D 7/2635 83/499 |
| 2008/0181711 | A1 * | 7/2008 | Monclus | B41J 11/70 400/621 |
| 2008/0196471 | A1 | 8/2008 | Fellenberg et al. | |
| 2010/0147046 | A1 * | 6/2010 | Allen | B21D 5/042 72/319 |
| 2014/0069247 | A1 * | 3/2014 | Lin | B26D 1/185 83/162 |
| 2015/0151346 | A1 * | 6/2015 | McIsaac | B21D 19/08 72/320 |
| 2015/0231680 | A1 * | 8/2015 | Jones | H05B 6/42 72/18.2 |
| 2016/0067988 | A1 * | 3/2016 | Anayama | B26D 5/08 83/492 |
| 2016/0075042 | A1 * | 3/2016 | Oh | B26B 29/00 30/265 |
| 2018/0154535 | A1 * | 6/2018 | Hayakawa | B26D 1/245 |
| 2018/0282104 | A1 * | 10/2018 | Matsunaga | B65H 35/08 |
| 2021/0229154 | A1 * | 7/2021 | Thieskes | B21D 5/004 |

* cited by examiner

BIDIRECTIONAL SHEET METAL CUTTING TOOL

TECHNICAL FIELD

The disclosure of the present patent application relates to sheet metal tools, and particularly to a bidirectional sheet metal cutting tool that can be mounted on a bending or folding machine.

BACKGROUND ART

Cutting of sheet metal and other sheet materials using a single cutting assembly generally requires that the cutting assembly have a capability of acting from one side of the sheet, extend across the entire length of the cut, or deflect the sheet across a part of the cutting assembly. The present disclosure is directed to the latter, i.e., to a cutting assembly that deflects the sheet.

The general cutting technique uses a scissors cut configuration, meaning the same assembly applies pressure from both sides of the sheet material or web. The scissors cut can be accomplished by having a cutting blade on both sides or one side of an opposing pair, which can use configurations having at least one of the blades configured as a rotary blade or cutting wheel. When the material being cut passes a connection between the opposing pair, which can be a hinge or a fixed attachment, an extended bypass cutting operation is performed. In the extended bypass cutting operation, the cut material bypasses the hinge or fixed attachment, allowing cutting to continue beyond the dimensional limits imposed by the hinge or fixed attachment.

As used herein, such a cutting operation is referred to as a progressive linear cutter, meaning that the cutting operation begins at one end of the length of the cut, and continues or progresses along that length. Such cutting is in some cases along a straight line. However, progressive linear cutting can occur with the cut being other than a straight line, for example curved or following a complex directional pattern.

A familiar example of deflecting the material is found in scissors-type cutting mechanisms. If the cut has a length that extends beyond the reach of the scissors, the cut material must deflect away from the hinge as the scissors progresses. The ability of the sheet metal to deflect is in a large part dependent on the sheet metal being flat. In the case of sheet metal, the deflection becomes difficult if the work (the workpiece) is already formed, for example by a sheet metal brake or other metal deforming machine. As a result, once the material is formed, it does not bend as easily, and when it is bent, it is more likely to become deformed.

When using a sheet metal bending brake, sometimes called "sheet metal brake", "bending machine" or "sheet metal folder", folds are made in the sheet material. The folded or forms in the sheet material often restrict the ability of the sheet metal to deflect, because in effect, the formed material is no longer flat. Thus a progressive linear cutter is difficult to use when a free end of the sheet to be cut is formed to have a non-flat shape.

In tools used with sheet material, the designation of "length" and "width" can differ according to the operation. In the case of brakes and similar metalworking tools, "length" can mean the forward progression of the work through the machine, whereas for the cutting operation, the "length" can mean the direction of the cut. If, as is often the case, the length of the cut is orthogonal to the direction of the forward progression of the work through the machine, the term "length" when describing a cut may be orthogonal to the lengthwise direction of the progression of work through the brake or other metalworking tool.

The typical approach to using a progressive cutter for sheet metal to be formed is to first use the cutter to cut portions from a larger piece, and then form the portions to a desired shape after the portions are cut. This of course means feeding the individual portions to the brake or other forming machine after individual portions are cut. Such a process of feeding the individual portions can be time consuming and either require additional labor or require additional robotic material handling, especially in the case of producing work products of significant length.

A further characteristic of progressive cutters is that it is often necessary to perform the cut in one direction. As a result, if the cut is made along a substantial length of cut, it is necessary for the cutting assembly to be returned "home" to a starting point in order to initiate a subsequent cut.

A sheet metal brake, in its simplest form, creates a linear bend in the sheet metal; however, more complex bends and shapes are possible. One particular type of brake is described in U.S. Pat. No. 6,324,882. That brake is configured so that upper and lower beams terminate in clamping tools to support the work, and has at least one tool carrier terminating in a bending tool having a curved pressure surface to press against the work to bend the work against the clamping tools. A lower beam arranged on the brake's machine frame and an upper beam arranged on the machine frame are configured so that the work can be fixed in position. A bending tool moving device allows a bending tool to be moved, in such a manner that the movements of the bending tool can be effected with bending movements of the bending tool. That type of sheet metal brake or bending tool has a bending nose with a curved pressure surface for acting upon one side of the fiat material. The bending tool is movable by the bending tool moving device between a starting bending position and an end bending position on a path about the respective bending edge which is predetermined in a defined manner such that the curved pressure surface and the side of the fiat material acted upon move relative to one another in the form of an essentially slide-free rolling on one another. This type of brake is sometimes called a "folder" or bending machine because it can easily be used to create folds in the work.

Thus, a bidirectional sheet metal cutting tool solving the aforementioned problems is desired.

DISCLOSURE OF INVENTION

The bidirectional sheet metal cutting tool is a cutting tool that performs cuts on webbed material in which a length of cut exceeds a physical dimension of the cutting tool, while limiting flexing of the webbed material during a cutting operation. The cutting tool comprises a cutter assembly riding on a guide track, and having upper and lower sections. The upper and lower sections have an offset attachment to each other at an interface, wherein the webbed material passes the offset after cutting in an extended bypass cutting operation. The interface has a curved profile between the upper and lower sections, allowing deflection of the webbed material on at least one side of a cutting direction in the extended bypass cutting operation. At least one pair of cutting wheels engages the webbed material prior to deflection.

In one configuration, a sheet metal forming tool is equipped with the cutting tool to allow sequential operations involving cutting sheet metal as the webbed material. The interface has a differentiation in its profile, the differentiation comprising the curved profile and at least one additional profile. The differentiation causes a differential deflection in the sheet metal downstream of the cut as the cutting assembly rides on the guide track. The deflection on one side of the sheet metal downstream of the cut exceeding the deflection of an other side of the metal downstream of the cut allows bypass cutting of sheet metal in a manner that reduces distortion of the sheet metal on a side of the cut in which the sheet metal forming tool had created or changed a profile in the sheet material.

These and other features of the present disclosure will become readily apparent upon further review of the following specification and drawings.

BRIEF DESCRIPTION OF THE DRAWINGS

Similar reference characters denote corresponding features consistently throughout the attached drawings.

BEST MODE(S) FOR CARRYING OUT THE INVENTION

The bidirectional sheet metal cutting tool is a slitter or cutter that is configured with a cutting head that causes the cut work (the workpiece) to deflect in opposite directions on opposite sides of the cutting head, where the work on one side deflects more than the work on the other side. This allows the side of the work that is more easily deflected without causing permanent distortion to deflect more, and allows the deflection on a side of the work that would be damaged or distorted by deflection to be deflected less.

When used with a sheet metal working tool (other than the cutter), such as a sheet metal brake, the deflection on the side of the cutting head facing the sheet metal working tool can be greater than the deflection on the side of the cutting head facing away from the sheet metal working tool. In that way, the working tool can progressively discharge worked sheet metal past the cutting head, and the major deflection can occur on the side of the cutting head that faces the sheet metal working tool. In one non-limiting example, the sheet metal working tool is a sheet metal brake of the type called a "folder". In a typical arrangement, the sheet metal is progressively discharged from the bender as successive forming operations are performed.

While a sheet metal brake is described, the sheet metal brake is given as a non-limiting example. The disclosed cutter can be used with other types of machines that may or may not be able to grip the work. In addition, the disclosed cutter can be used for types of webbed material other than sheet metal, with the primary motivation being an ability to deflect the webbed material in a bypass operation as the webbed material passes the cutter. Thus, a relatively stiff webbing on a roll can be cut by the disclosed cutter.

While bypass cutting is described, the disclosed techniques can also be used for pinch cutting, in which opposing elements create a cut in the work.

The deflection of the work on the side of the cutting head facing the sheet metal working tool appears counter-intuitive because the work would be clamped on that side. The reason this is advantageous is that in some cases, which by non-limiting example include sheet metal brakes, the discharged work is formed into non-flat shapes and therefore is not easily deflected without damage. On the other hand, after the shapes are discharged, the sheet metal on the side of the sheet metal working tool is still flat, i.e., not yet formed into non-flat shapes. By spacing the cutter head away from a clamping position, the sheet metal is able to deflect on the clamped side in a sort of waved pattern. Since the sheet metal is flat on that side, the deflection on that side falls well within the elastic deformation limits of the sheet metal.

If the deflection on the sheet metal working tool of the cutting head is too great to be limited to elastic deformation of the work, then the cutting head is positioned further from the clamping position, thus allowing cutting to take place without the deflection causing plastic deformation of the work. This positioning is expected to be necessary if the bends themselves are close to the edge of the final form, so after a cutting operation, it may be necessary to retract the un-formed part of the sheet metal for a subsequent forming operation, such as a subsequent bending operation by the above-described sheet metal brake.

It is expected in some operations, the side of the cutting head with the greater deflection would be faced away from the sheet metal forming machine, but this presumes that the part of the work furthest away from the sheet metal forming machine has the greatest ability to deflect.

Figure 1A:
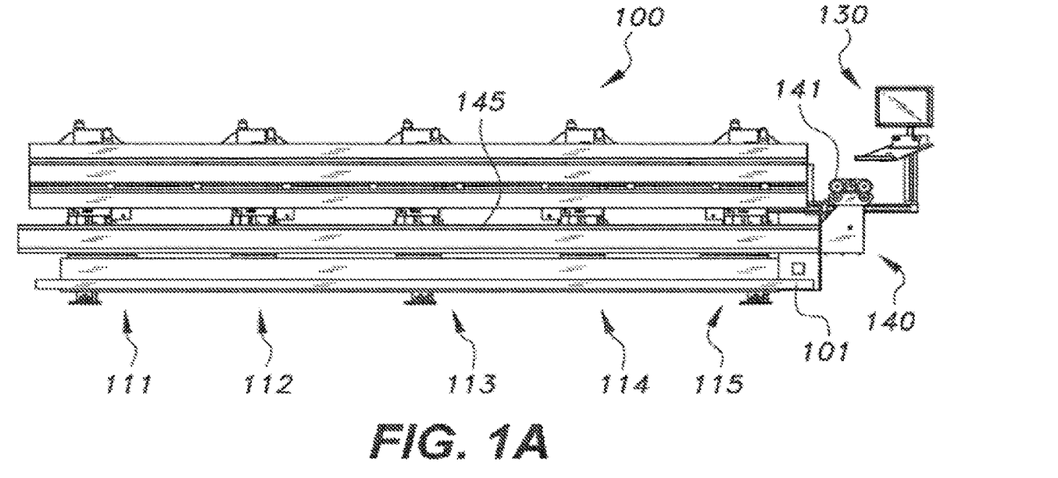
FIGS. 1A and 1B are perspective views showing a multi-station bending machine having a bidirectional sheet metal cutting tool assembly (also referred to herein as a slitter or slitting assembly) mounted thereon.
Figure 1B:
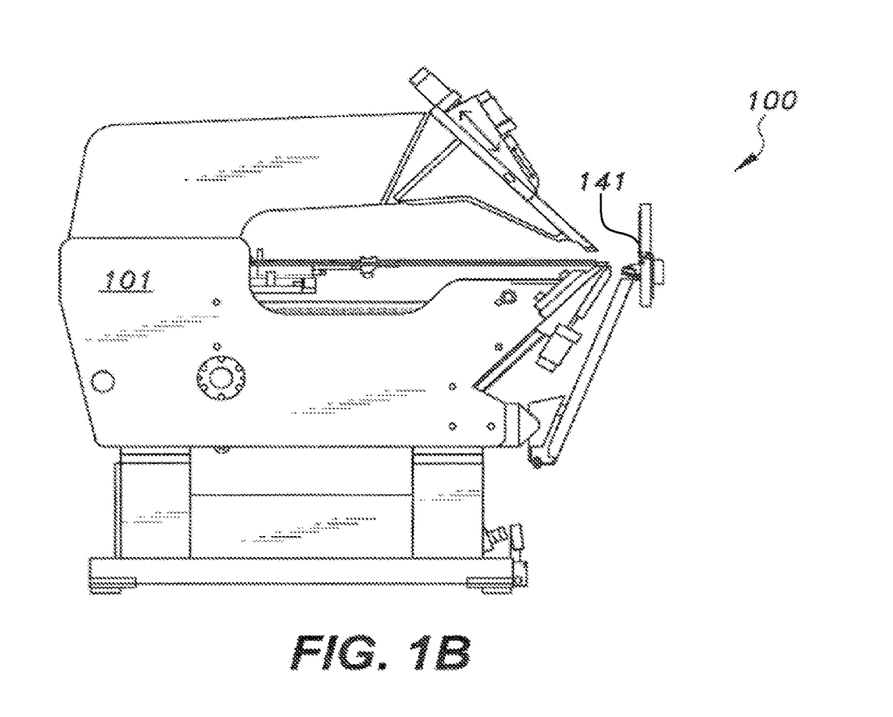

FIGS. 1A and 1B are perspective views showing a sheet metal folding brake 100 with a cutting wheel assembly mounted. The sheet metal folding brake is given as a non-limiting example, as it is only necessary for the work to be supported in some manner while being cut. Depicted is chassis 101, which functions as a frame and has fixed thereto a plurality of stations 111-115. Since the stations 111-115 are fixed to the chassis 101, the stations 111-115 are mechanically and functionally part of the chassis 101. Also mounted to the chassis 101 is a machine controller 130, which provides automated machine control functions, for example, by use of a processor and an associated memory.

Of note, the nomenclature of the machine (brake 100) and of the work results in a difference in which direction is described as the "length" and "width". The width of the brake 100 is indicated by stations 111-115, whereas the length of the work extends across the same stations 111-115. Thus, the width of the work is often orthogonal to the width of the machine.

A brake of this type is intended to perform bending and folding work on long pieces of metal, for example, 7 meters (21 ft.) long. The multiple stations 111-115 accommodate that length across the width of the brake 100.

Cutter assembly (or slitter assembly) 140, shown at one end of the brake 100, is caused to traverse in front of the brake 100 along track 145, in order to cut a portion of the work after the work is formed by the brake 100. The cutter assembly 140 comprises cutter head 141, which is used to cut sheet metal forming the work. The track 145 is mounted to the chassis 101, and the cutter assembly 140 rides on the track 145 to traverse in front of the brake 100.

In the usual circumstance, the brake 100 forms a width of the work by bending and folding, and then discharges the formed width out the front. According to the disclosed technology, after discharging the formed width of the work, the formed width of the work extends past cutter head 141. As a result, the formed part of the work is positioned past the path of the cutter head, as defined by the path of the cutter assembly 140 along the track 145. In order to perform a cut, the cutter assembly 140 is driven along track 145 across the width of the brake 100 by a cutter assembly drive (not separately shown). This allows the brake or other sheet metal forming mechanism to perform work on sequential portions of the sheet material, allowing the sequential portions of the sheet metal material to discharge from the sheet metal forming mechanism.

In order to cut the work, cutter head 141 must either extend around the work or otherwise move the work out of the way. In the disclosed configuration, cutter head 141 causes the work to deflect, so it is not necessary for the cutter head 141 to extend around the work. This deflection comprises a major deflection on the side of the work that is substantially flat, and a minor deflection on the side of the work that has been formed. In one non-limiting example, the side of the work that is substantially flat is on the side of brake 100, the major deflection is 9.525 mm or ⅜ inch, and the minor deflection is 3.175 mm or ⅛ inch. These figures would vary for the same cutter head configuration, depending on the physical nature of the work.

The deflection of the work at the cutter head 141 allows the use of a dual cutting wheel configuration in which two sets of opposing wheels are provided on the cutting head 141. The use of two sets of opposing wheels on the cutting head is facilitated by the deflection of the work because the deflection of the work also allows the work to clear a set of cutting wheels not in use during the cut. Since the configuration of FIGS. 1A and 1B allows cutting in two directions, the cutter assembly 140 is able to perform sequential cuts in opposite directions, thereby avoiding a need for the cutter assembly 140 to return to a home position on a particular side of the brake 100.

It is also possible to configure the cutter 140 so that all deflection occurs on one side of the cutter head 141. However, in the case of a dual cutter head, it would be necessary to either accept engagement with the trailing set of opposing wheels or otherwise configure the cutter head 140 to allow the trailing set of opposing wheels to clear the work. Alternatively, it would be possible to shift the cutter head 141 to reduce or avoid engagement of the cut portion of the work with the trailing set of opposing wheels.

Since a dual cutting arrangement is used for the cutter head 141, after the cutter assembly 140 is driven across the width of the brake 100, it is ready to perform a next cut in the opposite direction across the width of brake 100, using the other set of opposing wheels. This avoids a time delay that would occur if it were necessary for the cutter assembly 140 to return to its original home position, since the cutter assembly 140 would have home positions at each end of the track 145. This also avoids additional movement of the cutter head 141 between passes, which further has the advantage of avoiding additional movement of machine parts after the completion of a cutting pass.

Figure 2:
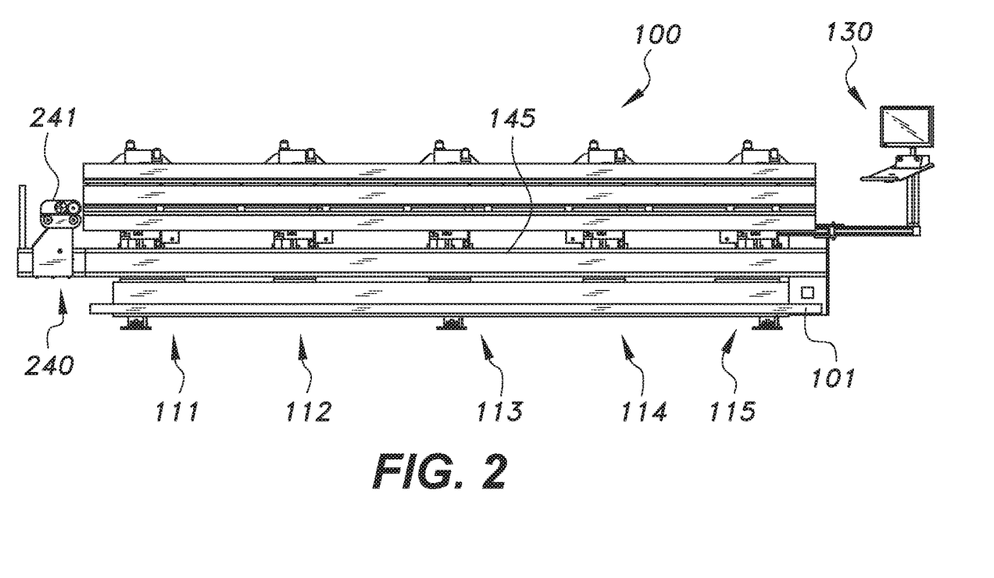
FIG. 2 is a perspective view showing a multi-station bending machine with a unidirectional cutter assembly (or slitter assembly) mounted thereon.
Figures 3A, 3B:
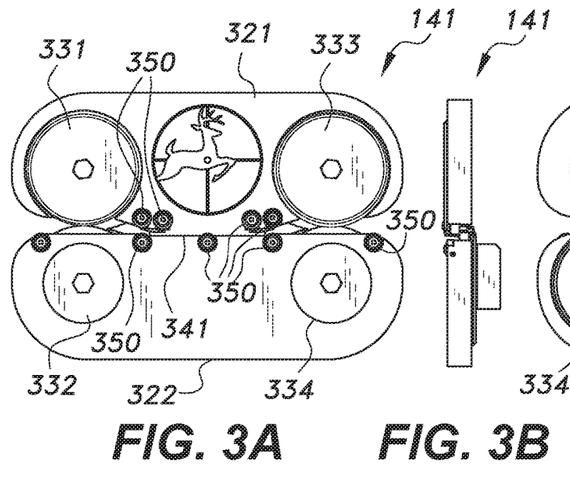
FIGS. 3A, 3B, 3C, and 3D are perspective views showing details of a bidirectional sheet metal cutting tool.
Figure 3C:
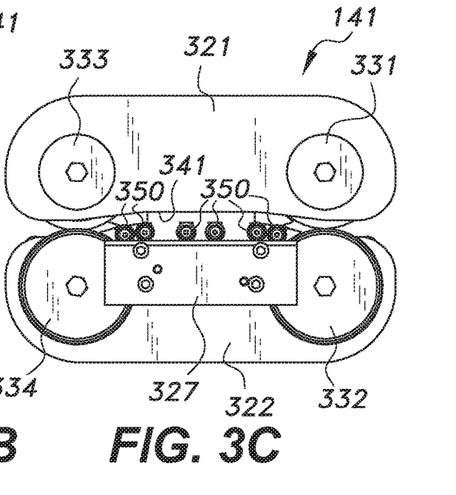
Figure 3D:
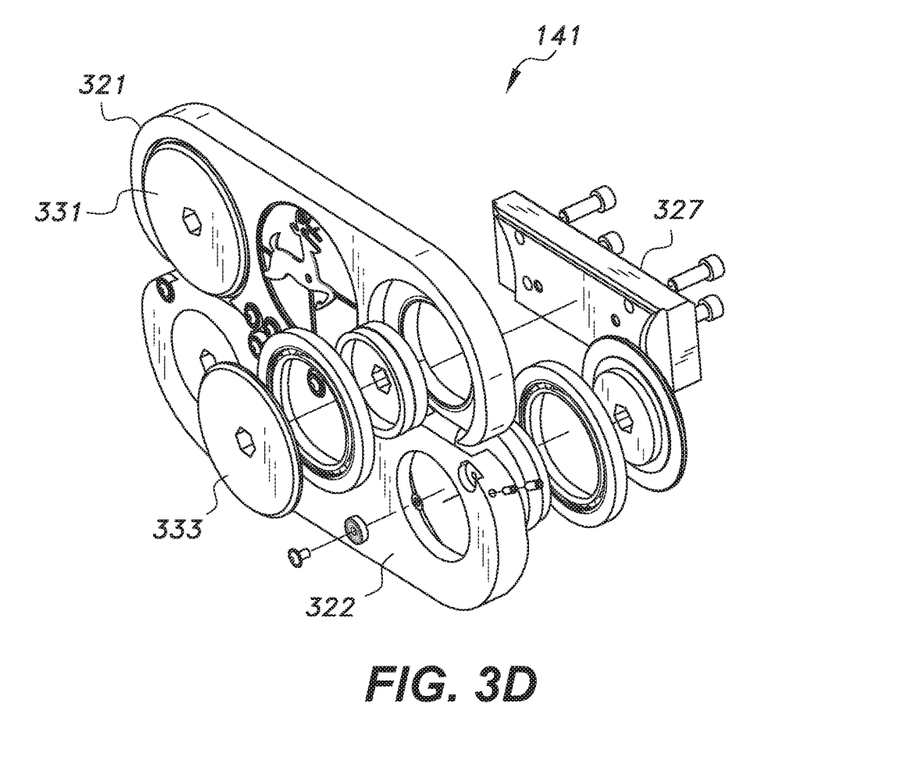

FIG. 2 shows a configuration in which a cutter assembly 240 uses a single cutting configuration for cutting head 241 using a single set of opposing wheels on cutting head 241. This configuration provides for deflection primarily in one direction of travel of the cutter assembly 240, so that after each pass, the cutter assembly 240 returns home. This requires a delay resulting from the return operation, during which machine movement is occurring, but makes it easier to configure the deflection of the work on the two sides of the cut. It is anticipated that in some cases, even the small deflection (given in the above example as the minor deflection of 3.175 mm, or ⅛ inch), may be difficult. By using a single set of opposing wheels on the cutting head 241, the minor deflection can be minimized or perhaps avoided.

FIGS. 3A-3D are perspective views showing a non-limiting example of the construction of the cutter head 141 having a dual cutting arrangement. Depicted are upper and lower wheel carriers 321, 322 and a carrier bracket 327. Wheel carriers 321, 322 support upper and lower wheel assemblies 331, 332, 333, 334, which are configured to rotate from opposite sides of the cutter head 141 according to whether the wheel assemblies are on the upper wheel carrier 321 (wheel assemblies 331, 333) or on the lower wheel carrier 322 (wheel assemblies 332, 334). Wheels assemblies 331-334 are configured to cut the work as the work progresses past the first pair of wheel assemblies. Since the work will have been cut, the lagging wheel assemblies serve primarily as guides. Therefore, the lead pair of wheel assemblies perform the cutting and are sometimes referred to as "slitter wheels". The lagging wheel assemblies are also slitter wheels because cutter assembly 140 performs cutting operations in both directions, but do not perform the cutting when they are lagging.

Wheel carriers 321, 322 have a curved interface 341 such that, on one side of the cutting head 141, the curved interface 341 allows the work to deflect down, and on the opposite side of the cutting head 141, the curved interface 341 allows the work to deflect up. In order to assist this deflection and guide the work without scraping the surface of the work, guide rollers 350 are provided along the interface 341.

Figure 4:
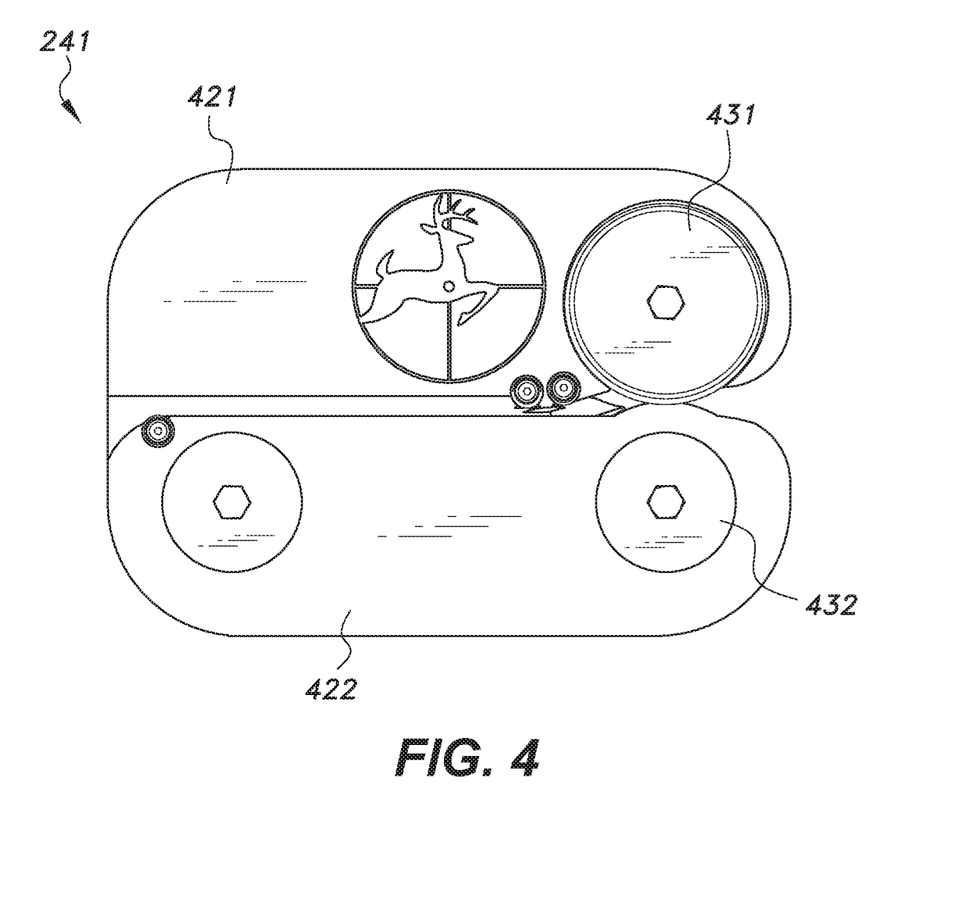
FIG. 4 is a perspective view showing details of a single cutter head.

FIG. 4 is a perspective view showing a non-limiting example of the construction of cutter head 241 having a single cutting arrangement. Depicted are upper and lower wheel carriers 421, 422 and carrier bracket 427. Wheel carriers 421, 422 support a single set of upper and lower wheel assemblies 431, 432 which are configured to rotate from opposite sides of cutter head 241 according to whether the wheel assemblies are on the upper wheel carrier 421 (wheel assembly 431) or on the lower wheel carrier 422 (wheel assembly 432). Wheels assemblies 431, 432 are configured to cut the work as the work progresses past the first pair of wheel assemblies. Since cutter assembly 240 uses a single cutting configuration, there are no lagging wheel assemblies.

Figure 5A:
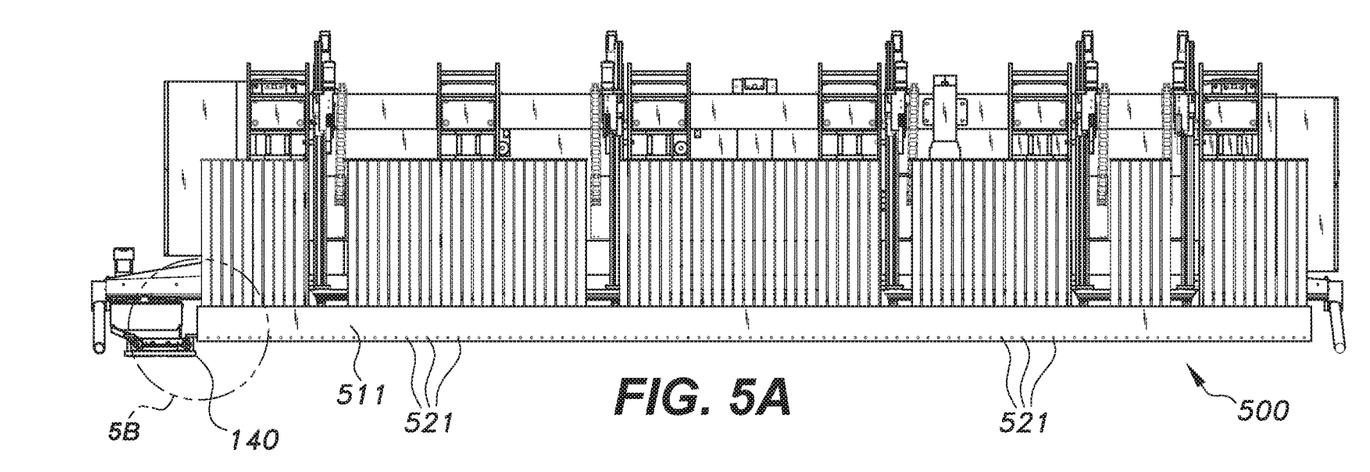
FIG. 5A is a top view of a sheet metal slitter having a bidirectional sheet metal cutting tool assembly mounted thereon.
Figure 5B:
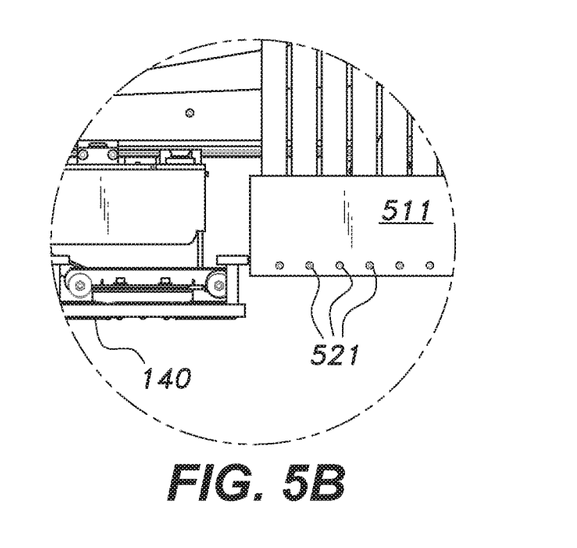
FIG. 5B is a detail view of area 5B of FIG. 5A.
Figure 5C:
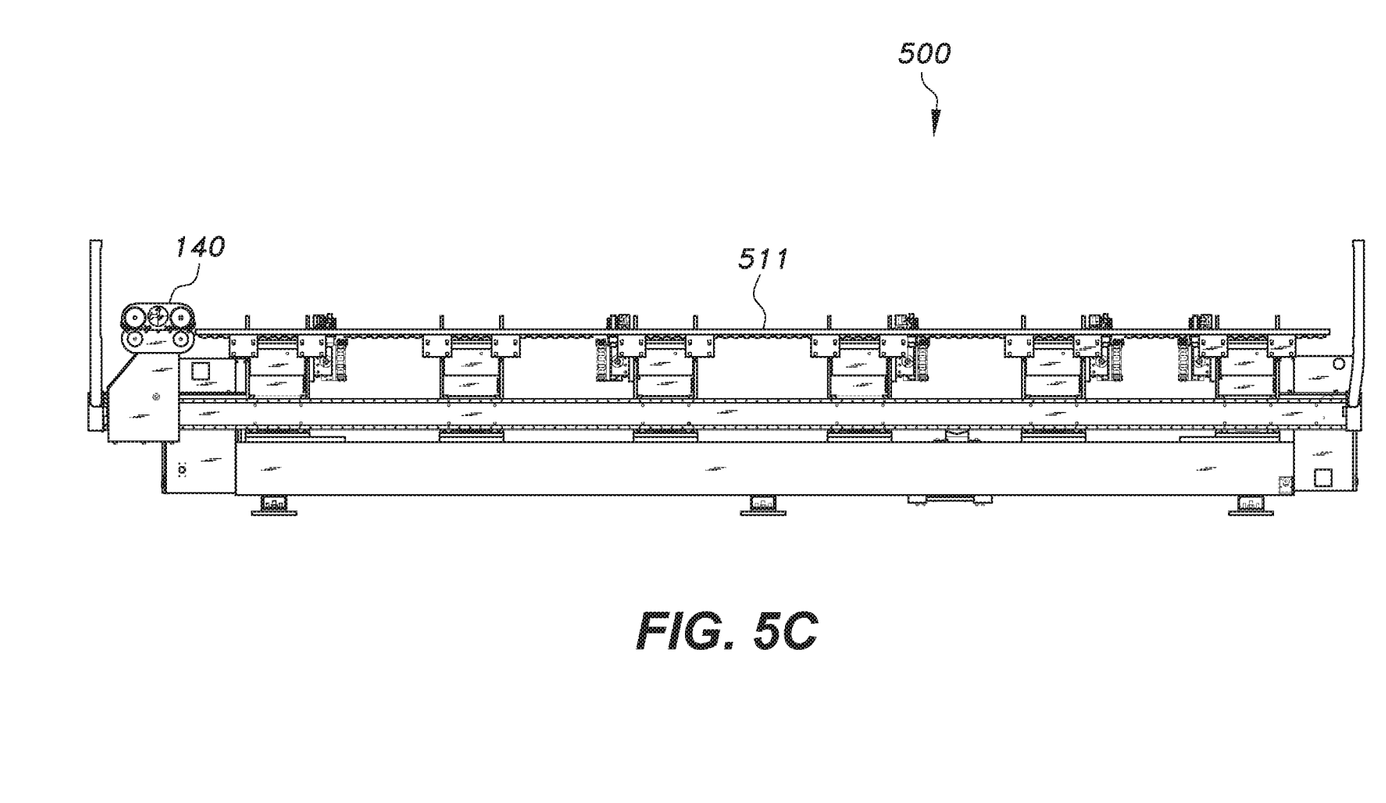
FIG. 5C is a front view of the slitter of FIG. 5A.

Cutter assembly 140 or 240 can be used on a stage in which the primary purpose of the stage with the cutter assembly is to function as a slitter. FIGS. 5A-5C are views showing a slitter 500, in which the cutter head or slitter assembly 140 is used on stage platform 511. FIGS. 5A and 5B are a top view and a detail view, respectively, and FIG. 5C is a front view. Thus, cutter assembly 140 or 240 has a mounting configuration allowing mounting track 145 to the sheet metal tool.

The platform 511 is provided with suction cups 521, which apply vacuum from a suction source (not shown) in order to hold work, such as sheet metal, in place on the platform 511. The work can be progressively moved for sequential cuts by movement of the suction cups 521, by use of a separate gripper, or manually.

While a bidirectional cutter head 140 is shown, it is also possible to use a unidirectional cutter head (e.g., cutter head 240). When the bidirectional cutter head 140 is used, sequential cuts can be made without the necessity for the cutting assembly to return "home" to a starting point in order to initiate a subsequent cut.

It is to be understood that the bidirectional sheet metal cutting tool is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A bidirectional sheet metal cutting tool, comprising:
   a guide track mounted at an output location of a sheet metal working tool wherein the sheet metal working tool clamps the sheet metal at an output of the sheet metal working tool;
   a cutter assembly riding on the guide track, the cutter assembly having upper and lower sections, the upper and lower sections having an offset attachment to each other at an interface, so that the sheet metal material passes an offset of the offset attachment after cutting in an extended bypass cutting operation, the interface having a curved profile providing a profile difference between the upper and lower sections, allowing deflection of the sheet metal material on at least one side of a cutting direction in the extended bypass cutting operation; and
   at least one pair of cutting wheels engaging the sheet metal material prior to deflection,
   wherein the sheet metal forming tool has a capability of gripping the sheet metal material,
   wherein the interface has a differentiation in its profile, the differentiation comprising the curved profile and at least one additional profile, the differentiation causing a differential deflection in the sheet metal downstream of the cut as the cutting assembly rides on the guide track, so that the deflection falls well within the elastic deformation limits of the sheet metal formed into non-flat shapes and not easily deflected without damage, thereby allowing bypass cutting of sheet metal in a manner that reduces distortion of the sheet metal on a side of the cut in which the sheet metal forming tool had created or changed a profile in the sheet material, so as to not damage a non-flat shape of the formed side of the work,
   wherein, the deflection on said side of the cut in which the sheet metal forming tool had created or changed a profile in the sheet material exceeds the deflection downstream of the cutting head, so that the working tool can progressively discharge worked sheet metal past the cutter assembly, and the major deflection can occur on the side of the cutter assembly that faces the sheet metal working tool,
   and wherein the cutter assembly has two pairs of opposing cutting wheels whereby the deflection of the sheet metal material also allows the sheet metal material to clear a lagging pair of the two pairs of opposing cutting wheels, with the lagging pair not in use for cutting during the extended bypass cutting operation, so that after the extended bypass cutting operation, the cutter assembly has a position allowing performing a subsequent bypass operation in an opposite cutting direction, with the previously lagging pair of the two pairs of opposing cutting wheels becoming the leading pair of cutting wheels and cutting the sheet metal material in the subsequent extended bypass cutting operation.

2. The bidirectional sheet metal cutting tool of claim 1, wherein the deflection on one side of the sheet metal material downstream of the cut exceeds the deflection of an other side of the sheet metal material downstream of the cut, thereby allowing bypass cutting of sheet metal material, after which the sheet metal material on the other side has a restricted capacity for accepting deflection.

3. The bidirectional sheet metal cutting tool of claim 1, wherein the deflection on one side of the sheet metal downstream of the cut exceeds the deflection of an other side of the metal downstream of the cut, thereby allowing bypass cutting of sheet metal in a manner that reduces distortion of the sheet metal on a side of the cut in which the sheet metal forming tool had created or changed a profile in the sheet material.

4. A sheet metal forming tool comprising:
   a sheet metal forming mechanism capable of creating or changing a profile in sequential portions of the sheet material, allowing the sequential portions of the sheet metal material to discharge from the sheet metal forming mechanism; and
   the cutting tool of claim 3.

5. The sheet metal forming tool of claim 4, wherein the deflection on the side of the sheet metal material that exceeds the deflection on the other side faces the sheet metal forming mechanism, so that the sheet metal discharged from the sheet metal forming mechanism extends beyond a track of the cutter assembly, thereby causing the deflection on the side of the sheet metal that exceeds the deflection on the other side to occur on a side of the cutter assembly facing the sheet metal forming mechanism and gripped by the sheet metal forming tool, and the lesser deflection occurring on a side of the cut in which the sheet metal has the changed profile.

6. A sheet metal cutting tool comprising:
   the sheet metal tool comprising a sheet metal supporting platform capable of said gripping the sheet metal, allowing the sequential portions of the sheet metal material to discharge from the sheet metal supporting platform; and
   the cutting tool of claim 1.

7. A sheet metal brake comprising:
   a sheet metal forming mechanism capable of creating or changing a profile in sequential portions of the sheet material by creating bends or folds in the sheet material across a width of the sheet metal brake, allowing the sequential portions of the sheet material to discharge from the sheet metal forming mechanism; and
   the cutting tool of claim 1, wherein:
   the guide track has a mounting configuration allowing mounting the guide track to a chassis of the sheet metal brake, with said cutter assembly riding on the guide track; and
   the sheet metal discharged from the sheet metal brake extends beyond a track of the cutter assembly, thereby causing the deflection on the side of the sheet metal that exceeds the deflection on the other side to occur on a side of the cutter assembly facing the sheet metal brake and gripped by the sheet metal forming tool, and the greater deflection occurring on a side of the cut in which the sheet metal has the changed profile,
   wherein the cutter assembly has two pairs of opposing cutting wheels, whereby the deflection of the sheet metal also allows the sheet metal to clear a lagging pair of said two pairs of opposing cutting wheels, with the lagging pair not in use for cutting during the extended bypass cutting operation, so that after the extended bypass cutting operation, the cutter assembly has a position allowing performing a subsequent bypass operation in an opposite cutting direction, with the previously lagging pair of the two pairs of opposing cutting wheels becoming the leading pair of cutting wheels and cutting the sheet metal in the subsequent extended bypass cutting operation.

8. A method of cutting sheet metal material, the method comprising the steps of:
providing a cutting assembly riding on a guide track mounted at an output location of a sheet metal working tool wherein the sheet metal working tool clamps the sheet metal at an output of the sheet metal working tool, the cutter assembly having upper and lower sections, wherein the upper and lower sections have an offset attachment to each other at an interface, in order to allow the sheet metal material to pass an offset of the offset attachment after cutting in an extended bypass cutting operation; and
using a curved profile at the interface and providing a profile difference to deflect the sheet metal material on at least one side of a cutting direction in the extended bypass cutting operation,
further comprising the step of providing the cutter assembly with two pairs of opposing cutting wheels, whereby the deflection of the sheet metal material also allows the sheet metal material to clear a lagging pair of the two pairs of opposing cutting wheels, with the lagging pair not in use for cutting during the extended bypass cutting operation, so that after the extended bypass cutting operation, the cutter assembly has a position allowing performing a subsequent bypass operation in an opposite cutting direction, with the previously lagging pair of the two pairs of opposing cutting wheels becoming the leading pair of cutting wheels and cutting the sheet metal material in the subsequent extended bypass cutting operation,
wherein the guide track has a mounting configuration allowing mounting the guide track to a sheet metal forming tool with said cutter assembly riding on the guide track,
wherein, the deflection on said side of the cut in which the sheet metal forming tool had created or changed a profile in the sheet material exceeds the deflection downstream of the cutting head, so that the working tool can progressively discharge worked sheet metal past the cutter assembly, and the major deflection can occur on the side of the cutter assembly that faces the sheet metal working tool,
and wherein the interface has a differentiation in its profile, the differentiation comprising the curved profile and at least one additional profile, the differentiation causing a differential deflection in the sheet metal downstream of the cut as the cutting assembly rides on the guide track, so that the deflection falls well within the elastic deformation limits of the sheet metal formed into non-flat shapes and not easily deflected without damage, thereby allowing bypass cutting of sheet metal in a manner that reduces distortion of the sheet metal on a side of the cut in which the sheet metal forming tool had created or changed a profile in the sheet material, so as to not damage a non-flat shape of the formed side of the work.

9. The method of cutting sheet metal material of claim 8, the deflection on one side of the sheet metal material downstream of the cut exceeds the deflection of another side of the sheet metal material downstream of the cut, thereby allowing bypass cutting of sheet metal material, after which the sheet metal material on the other side has a restricted capacity for accepting deflection.

10. The method of cutting sheet metal material of claim 8, further comprising the steps of:
mounting the guide track to a sheet metal forming tool;
using the sheet metal forming tool to grip the sheet metal, thereby allowing bypass cutting of sheet metal in a manner that reduces distortion of the sheet metal on a side of the cut in which the sheet metal forming tool had created or changed a profile in the sheet material.

* * * * *